United States Patent
Mohan

(10) Patent No.: US 7,559,736 B1
(45) Date of Patent: Jul. 14, 2009

(54) APPARATUS AND METHOD FOR EFFICIENTLY LOADING AND UNLOADING RACKS OF POTTED PLANTS IN A WHOLESALE NURSERY WHERE THE PLANTS ARE GROWING

(76) Inventor: Thomas Streett Mohan, 4943 St. Paul's Church Rd., Pylesville, MD (US) 21132

( * ) Notice: Subject to any disclaimer, the term of this patent is extended or adjusted under 35 U.S.C. 154(b) by 539 days.

(21) Appl. No.: 11/222,062

(22) Filed: Sep. 8, 2005

(51) Int. Cl.
*B60P 1/64* (2006.01)
(52) U.S. Cl. .................. 414/482; 414/471; 414/498; 414/608; 280/33.996; 280/33.998; 280/43.11; 280/43.23; 254/2 C; 254/3 C
(58) Field of Classification Search ......... 414/482–483, 414/485, 498, 458, 471, 608; 280/43.23, 280/43.1, 43.11, 33.996, 33.998, 414.5; 211/85.8; 410/7; 254/2 C, 3 C
See application file for complete search history.

(56) References Cited

U.S. PATENT DOCUMENTS

| | | | |
|---|---|---|---|
| 2,227,762 A | 1/1941 | Ronning | 267/58 |
| 2,623,759 A * | 12/1952 | Forbas | 410/30 |
| 2,648,546 A | 8/1953 | Falkenhagen | 280/44 |
| 2,774,606 A * | 12/1956 | Burweger et al. | 280/414.5 |
| 3,021,795 A * | 2/1962 | Hayba et al. | 104/48 |
| 3,062,558 A | 11/1962 | Krolicki | 280/43.23 |
| 3,292,801 A * | 12/1966 | Walz et al. | 414/458 |
| 3,869,052 A * | 3/1975 | Leahy | 414/401 |
| 3,876,222 A * | 4/1975 | Thorsell | 280/43.19 |
| 3,972,308 A * | 8/1976 | Ray | 119/60 |
| 4,155,471 A * | 5/1979 | Yancy | 414/420 |
| 4,515,518 A * | 5/1985 | Gilbert et al. | 414/459 |
| 4,884,936 A * | 12/1989 | Kawada | 414/498 |
| 5,288,197 A | 2/1994 | Harris | 414/495 |
| 5,387,063 A * | 2/1995 | Napierkowski et al. | 410/67 |
| 5,431,521 A * | 7/1995 | Napierkowski et al. | 414/401 |
| 5,474,416 A * | 12/1995 | Rogge et al. | 414/482 |
| 5,649,802 A * | 7/1997 | Babcock | 414/483 |
| 5,951,233 A * | 9/1999 | Boucher et al. | 414/495 |
| 6,695,564 B2 | 2/2004 | Pfisterer | 414/485 |
| 6,866,463 B2 * | 3/2005 | Riordan et al. | 414/498 |
| 7,044,704 B1 * | 5/2006 | Roose | 414/471 |
| 2005/0067799 A1 | 3/2005 | Smith | 280/6.151 |

* cited by examiner

*Primary Examiner*—Michael S Lowe

(57) ABSTRACT

A wheeled cart having a bed, two side walls, a front wall and an open end which is connected to a towing vehicle. The bed of the cart is raised or lowered to be inclined toward the open end to load the cart. The bed is level when the cart is loaded. A latch secures the rack within the cart and the latch is manually releasable.

9 Claims, 14 Drawing Sheets

APPARATUS AND METHOD FOR EFFICIENTLY LOADING AND UNLOADING RACKS OF POTTED PLANTS IN A WHOLESALE NURSERY WHERE THE PLANTS ARE GROWING

BACKGROUND OF THE INVENTION

1. Field of the Invention

The present invention relates to an apparatus for loading and unloading items on a mobile rack and more particularly, the mobile rack being used in a nursery for plants.

2. Description of Related Art

Plants, such as perennials, are grown in large acreage farms and are distributed to retail nurseries who, in turn, sell to landscapers and homeowners.

These plants are potted, and the size of the pots may range from two (2) to eight (8) quarts. These potted plants, at the desired size, are then manually loaded into racks. These racks are formed as a wheeled cage, about six (6) feet tall, and may contain around 100 two-quart plants (for example). The plants are on shelves in the rack, and the rack has four (4) wheels for mobility.

These racks must then be loaded into a trailer or a box truck for delivery to retailers and nurseries. The trucks have lift gates or platforms that can be lowered, hydraulically. Loading is sideways on a box truck.

Forklift trucks are used for loading and unloading the racks. During peak season, as many as 28,000 plants per day may be loaded. The present procedures require enormous amounts of hand labor which is very costly and entails many safety problems.

The applicant is aware of the following references:

| Patents | |
|---|---|
| Inventor(s) | Pat. No. |
| Ronning | 2,227,762 |
| Falkenhagen | 2,648,546 |
| Krolicki | 3,062,558 |
| Harris | 5,288,197 |
| Pfisterer | 6,695,564 |
| Published Application | |
| Inventor(s) | Published No. |
| Smith | US 2005/0067799 |

Ronning disclosed a frame and wheel suspension assembly for a trailer, wherein the trailer may be supported for a desired clearance above the ground, and wherein the trailer may rest flat upon the ground for loading and unloading purposes, respectively. In the mechanism, a tubular member 15 is adjustably mounted in the frame and rotatably supports the crank axles of the wheels for virtual movement thereof.

Falkenhagen disclosed a hydraulic lift trailer that can be raised to a transporting position and subsequently dropped to ground level for unloading. A piston, in a cylinder carried by each wheel, engages the frame assembly for its raised position.

Krolicki disclosed a vertically-adjustable tiltable trailer. The structure includes a rocker plate pivotably connected to side rails.

Harris disclosed an equipment trailer wherein the bed can be lowered to ground level or raised above ground level, so that low-clearance equipment may be loaded from ground level or from a dock elevated above the ground.

Pfisterer disclosed a self-loading cart for mowers with a tilting bed mounted to a frame. A locking torque is provided for retention of the mowers.

Smith disclosed a trailer receiving a bed and being hitched to a powered vehicle. The trailer has an inclining feature.

However, no references are known which relate to trailers or racks used to move plants in a nursery.

SUMMARY OF THE INVENTION

It is an object of the present invention to provide an economical, labor-saving device to load and unload potted plants in a nursery.

It is a further object of the present invention to provide a wheeled cart having a bed which can be raised, lowered and inclined.

In accordance with the teachings of the present invention there is disclosed an apparatus for efficiently and conveniently loading a mobile rack, the rack holding a plurality of potted plants grown at a first location at a wholesale nursery and subsequently unloading the rack at a second location at the nursery for loading the rack on a truck or other transport for ultimate delivery of the potted plants to a retail nursery. A wheeled cart is adapted to be coupled to a tractor or other powered vehicle. The cart has an open back end, a front wall and a bed initially lowered to substantially the ground level to enable the rack to be moved onto the bed of the cart. A latch is in the cart for engaging the rack when the rack is moved onto the bed of the cart, thereby releasably retaining the rack to the cart during transport at the wholesale nursery. The bed of the cart is thereafter raised above the ground level when the cart is at the second location, and means on the cart are provided for disabling the latch to remove the rack from the cart at the second location.

In further accordance with the teachings of the present invention, there is disclosed a cart, comprising a bed, a front wall, respective side walls, and an open rear end. The bed is angled slightly downwardly from the front wall of the cart to the open rear end of the cart thereby enabling articles to be moved off the bed. The bed is lowered to substantially the ground level at the open end of the cart and is inclined upwardly toward the front wall on the cart. The bed is raised above the ground for transport of the cart and subsequently lowered to substantially the ground level for unloading articles on the cart. A box is mounted on the front wall, the box containing hydraulic and electrical components for alternately raising and lowering the bed.

In still further accordance with the teachings of the present invention, there is disclosed a wheeled cart having a bed and two opposite sidewalls and further having an open end. A rack is adapted to be moved through the open end of the cart and onto the bed thereof. A latch automatically engages the rack as the rack is moved onto the bed of the cart. A manually-operated release mechanism on the cart release the latch for moving the rack off the bed of the cart.

In another aspect of the present invention, there is disclosed a method of efficiently and conveniently transporting a mobile rack holding a plurality of articles from a first location to a second location. A wheeled cart is provided, the cart having an open back end and a front wall and further having a bed therebetween. The bed may be raised and alternately lowered to substantially the ground level. The back end of the bed is lowered to substantially the ground level. The rack is moved through the open end of the cart and towards the front wall of the cart. A manually-releasable latching mechanism is provided on the cart which automatically engages the rack as the rack is moved onto the bed of the cart. The bed of the cart is raised above the ground level. The cart is transported from the first to the second location. The back end of the bed is lowered to substantially the ground level. The latching mechanism is manually released and the rack is moved out of the cart through the open end thereof.

These and other objects of the present invention will become apparent from a reading of the following specification taken in conjunction with the enclosed drawings.

DESCRIPTION OF THE PREFERRED EMBODIMENT

Figure 1:
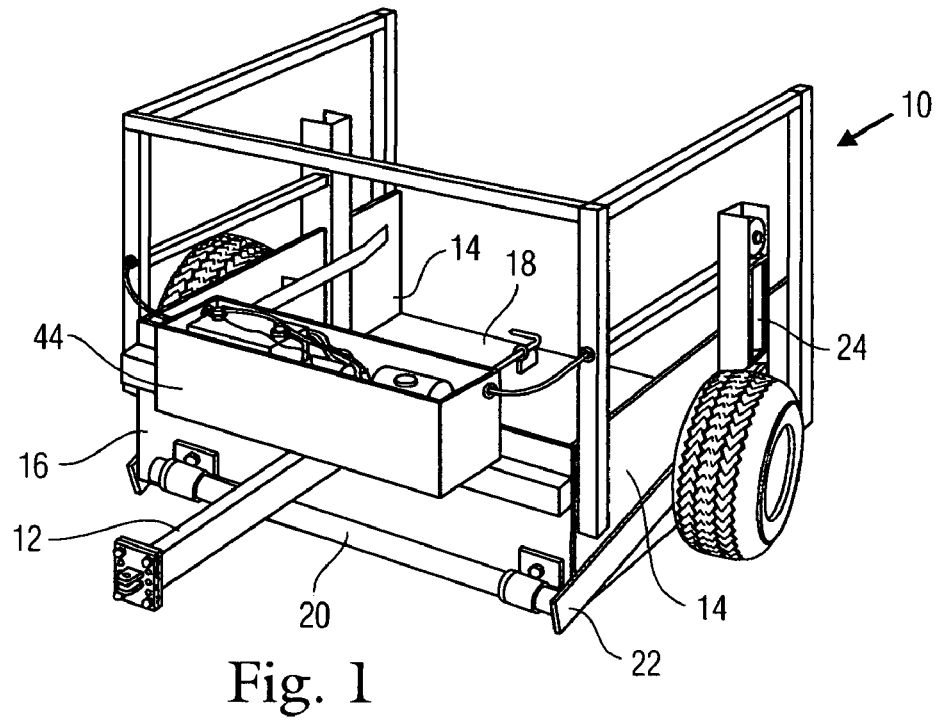
FIG. 1 is a perspective view of the present invention taken from the front of the cart.
Figure 2:
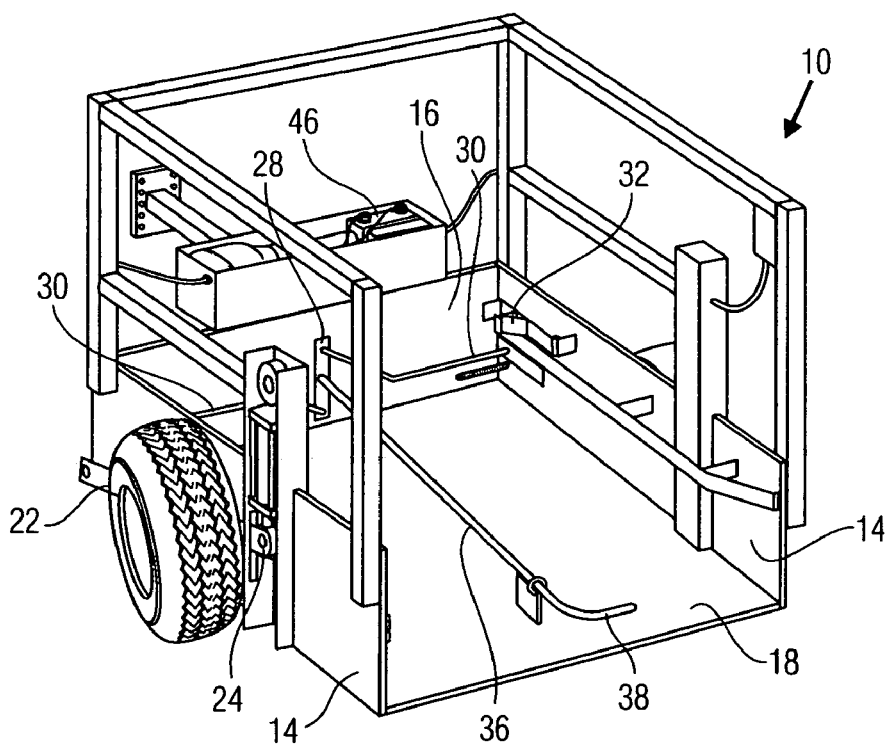
FIG. 2 is a perspective view of the present invention taken from the back of the cart.
Figure 3:
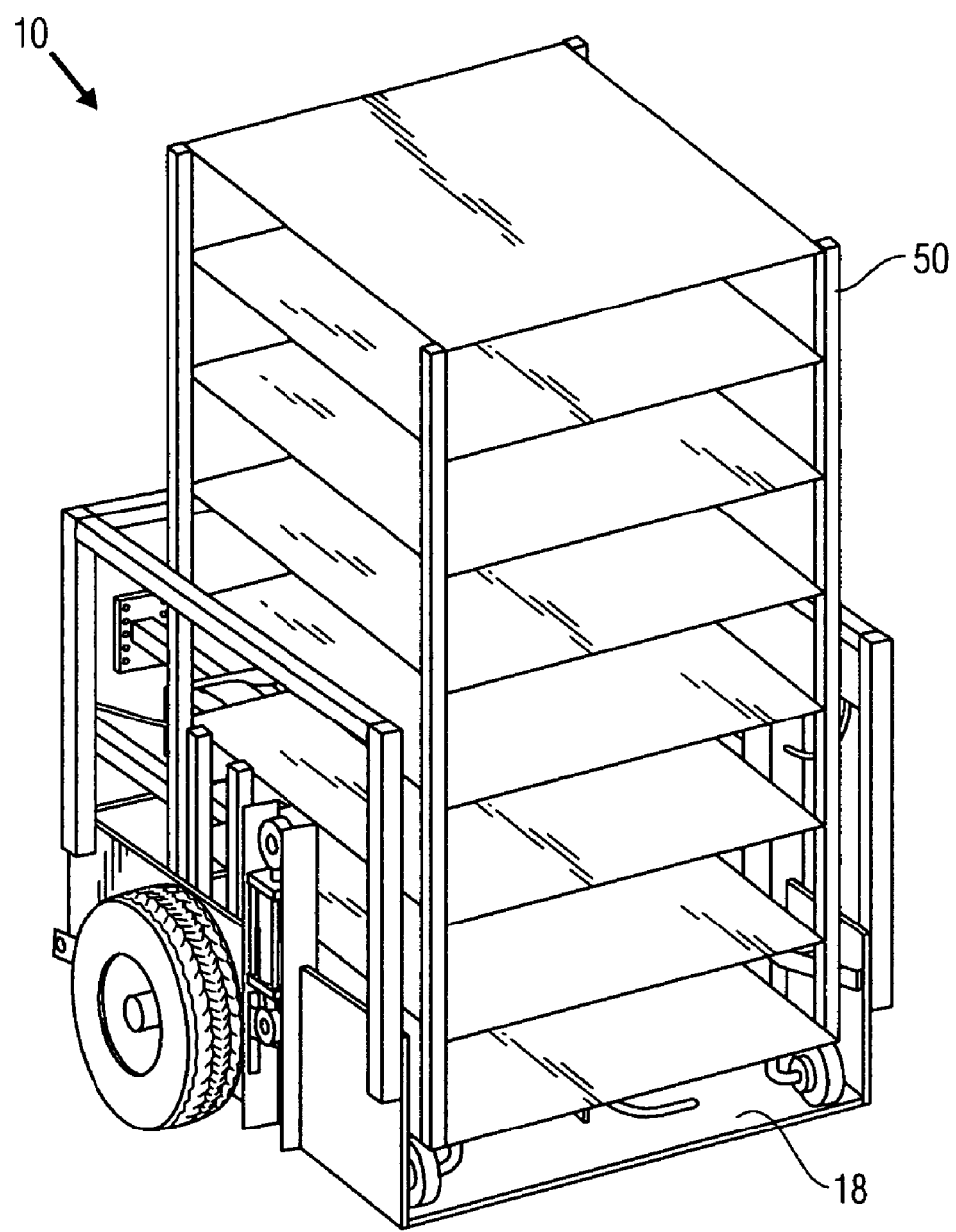
FIG. 3 is a perspective view of the present invention with a rack received in the cart.

Referring to FIGS. 1-3, there is disclosed a cart 10 which may be used to transport objects of numerous types. While the present disclosure is to move racks of potted plants in a nursery, the cart may be used with diverse objects ranging from packaged merchandise to bulk material. The cart 10 preferably has two wheels and a hitch 12 such that the cart can be connected to a powered tow vehicle.

The cart 10 has two opposite side walls 14 connected to a front wall 16. The rear of the cart is open so that objects to be transported may be easily loaded in the cart 10. The walls 14, 16 are supported on a bed 18.

Figure 4:
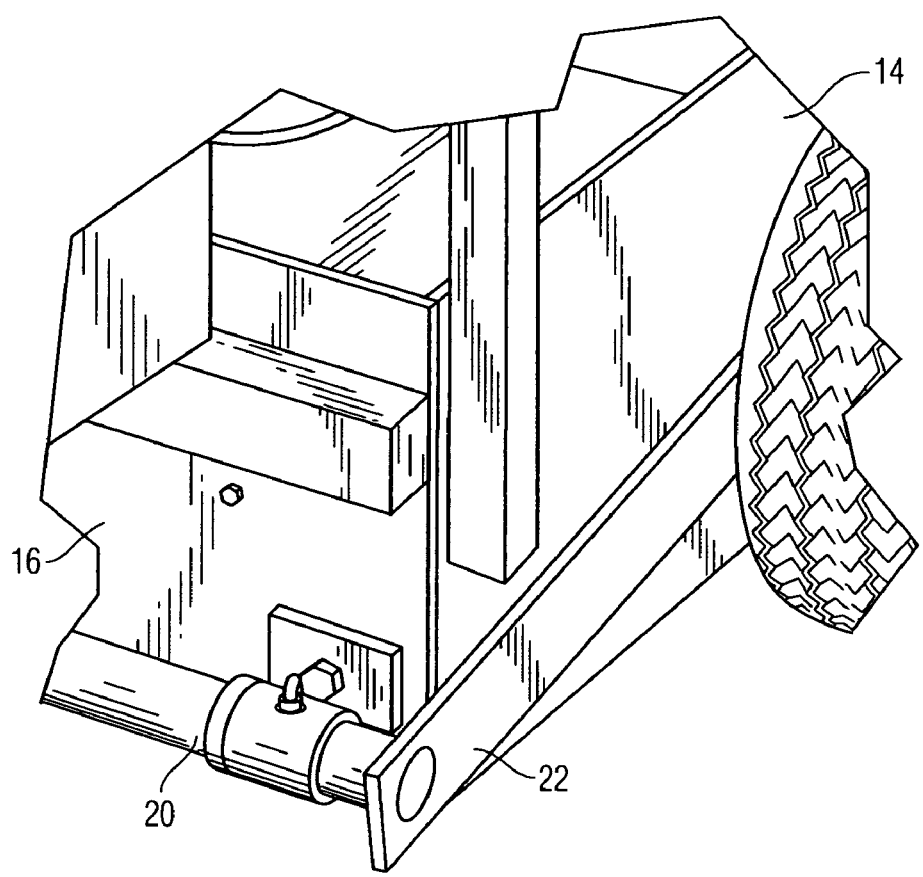
FIG. 4 is a perspective view of the front of the cart showing the transverse axle pivotally connected to the member adjacent to the side of the cart.
Figure 5:
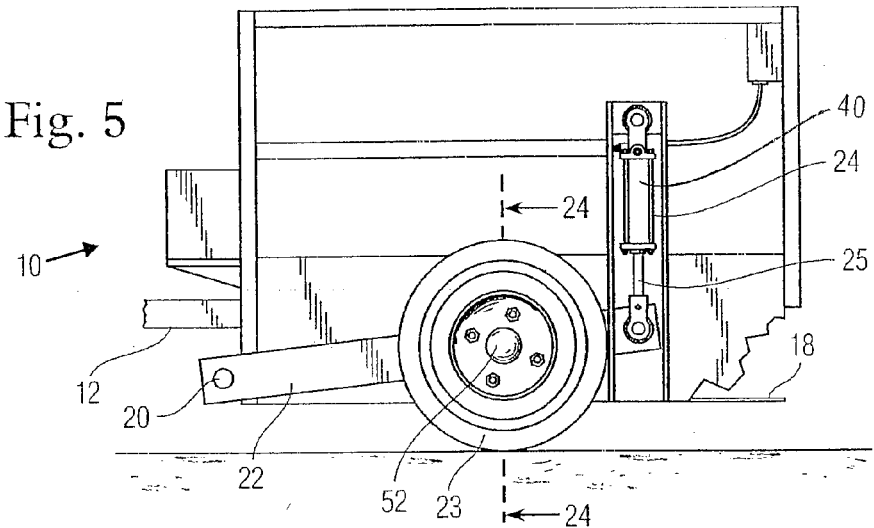
FIG. 5 is a partial cut-away side view showing the second end of the member of FIG. 4 in a lowered position such that the bed of the cart is in a substantially level position.
Figure 6:
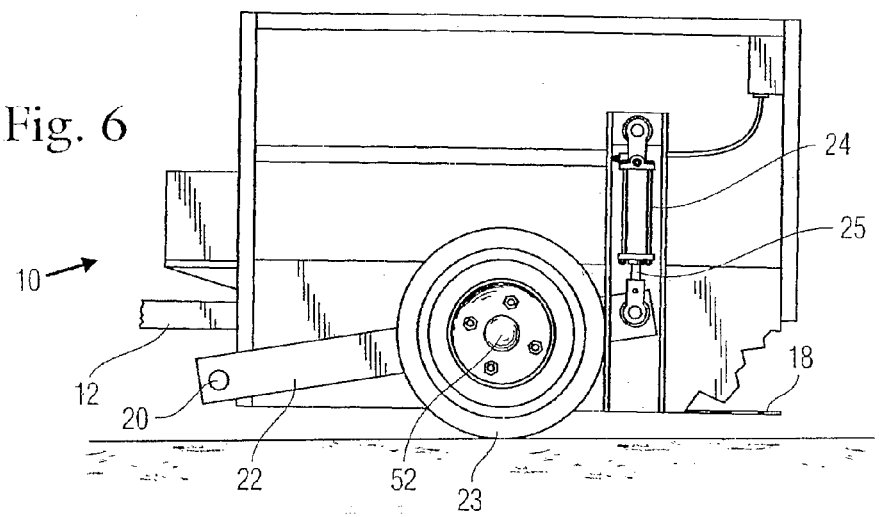
FIG. 6 is a partial cut-away side view showing the second end of the member of FIG. 5 in an intermediate position.
Figure 7:
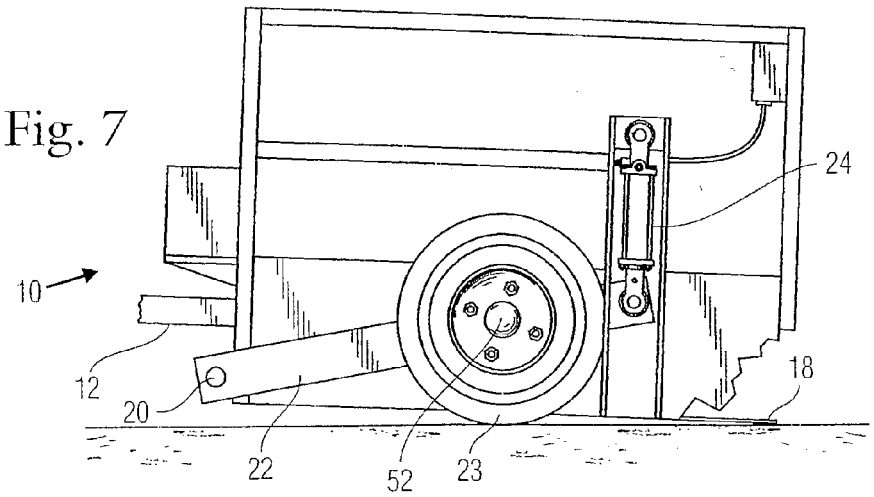
FIG. 7 is a partial cut-away side view showing the second end of the member of FIG. 5 in a raised position such that the bed of the cart contacts the ground.

Mounted on the front wall 16 of the cart 10 adjacent to the bed 18, there is a transverse axle 20 which extends between the side walls 14 (FIG. 4). Pivotally connected to opposite ends of the axle are first ends of respective members 22, one adjacent to each side wall. The opposite second ends of each member 22 are connected to a means 24 for raising and lowering the bed 18. A wheel 23 is connected to each side of the cart 10 with the respective wheel axle connected to the respective member 22. As shown in FIGS. 5-7, when the means 24 is activated to lower the bed 18, the second ends of the members 22 are elevated and the first ends of the members 22 pivot about the axle 20. In FIGS. 5-7, the means 24 to raise and lower the bed are a pair of hydraulic cylinders on opposite sides of the cart 10. FIGS. 5-7 show a piston 25 in the cylinder. In FIG. 5, the piston 25 is fully extended from the cylinder raising the bed with respect to the ground. In FIG. 6, the piston 25 is partially extended from the cylinder having the bed in an intermediate position with respect to the ground. In FIG. 7, the piston 25 is not extended from the cylinder having the bed in an inclined position with respect to the ground. In this manner, the bed 18 at the open end of the cart 10 may be in contact with the ground so that the bed may be inclined upwardly toward the front wall 16 of the cart 10. When the means 24 is activated to raise the bed 18, the second ends of the members 22 are lowered and the first ends of the members 22 pivot about the axle 20. The bed 18 is disposed in a level position between the front wall 16 and the open end of the cart 10 when the second ends of the members 22 are elevated.

The raising and lowering of the bed 18 of the cart 10 operates in a manner similar to a see-saw. The fulcrum of the system is the wheel 23 which is on the ground with the wheel axle 52 connected to the member 22. The member 22 acts as the beam on the see-saw which has the second end raised or lowered by the means 24 (the hydraulic cylinder) while the first end of the member 22 pivots about the axle 20. When the piston 25 extends from the hydraulic cylinder, it effectively pushes the open end of the cart 10 upwardly so that the bed 18 is substantially level with the ground.

Figure 8:
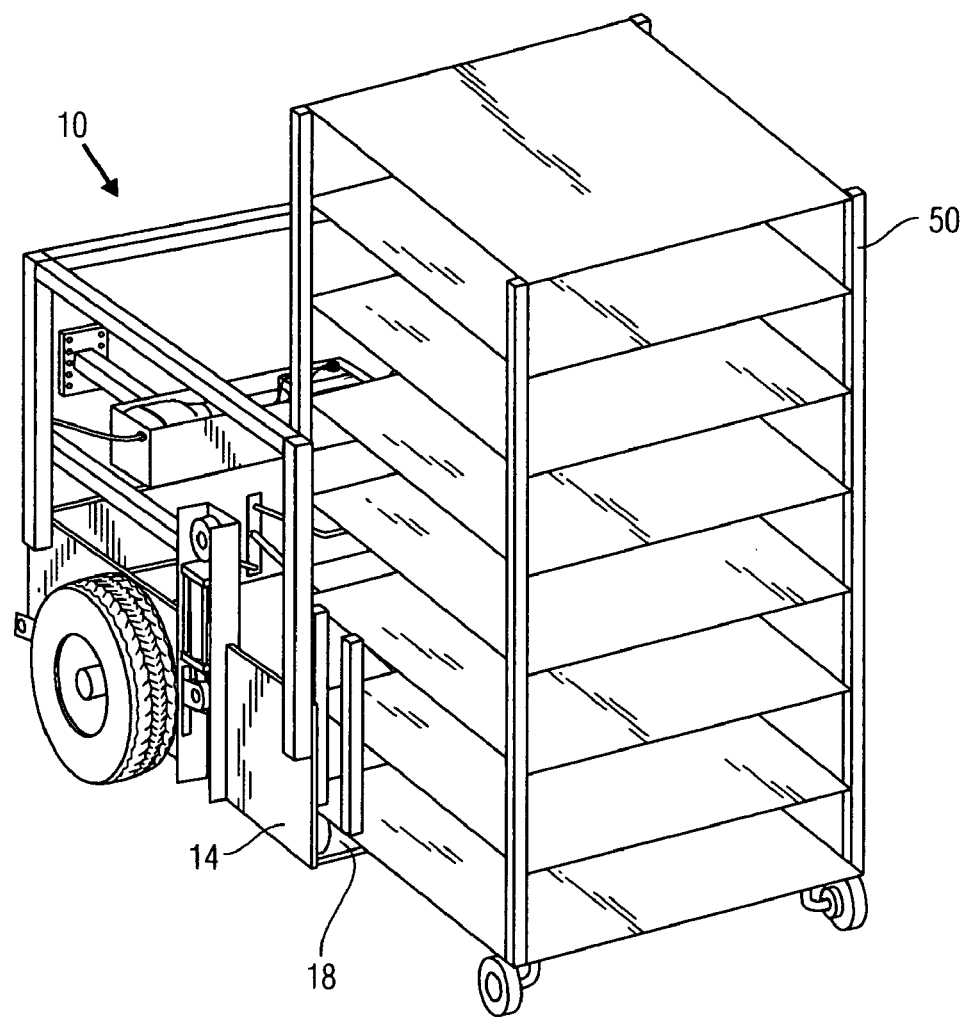
FIG. 8 is a perspective view showing a rack being rolled into the lowered bed of the cart.
Figure 9:
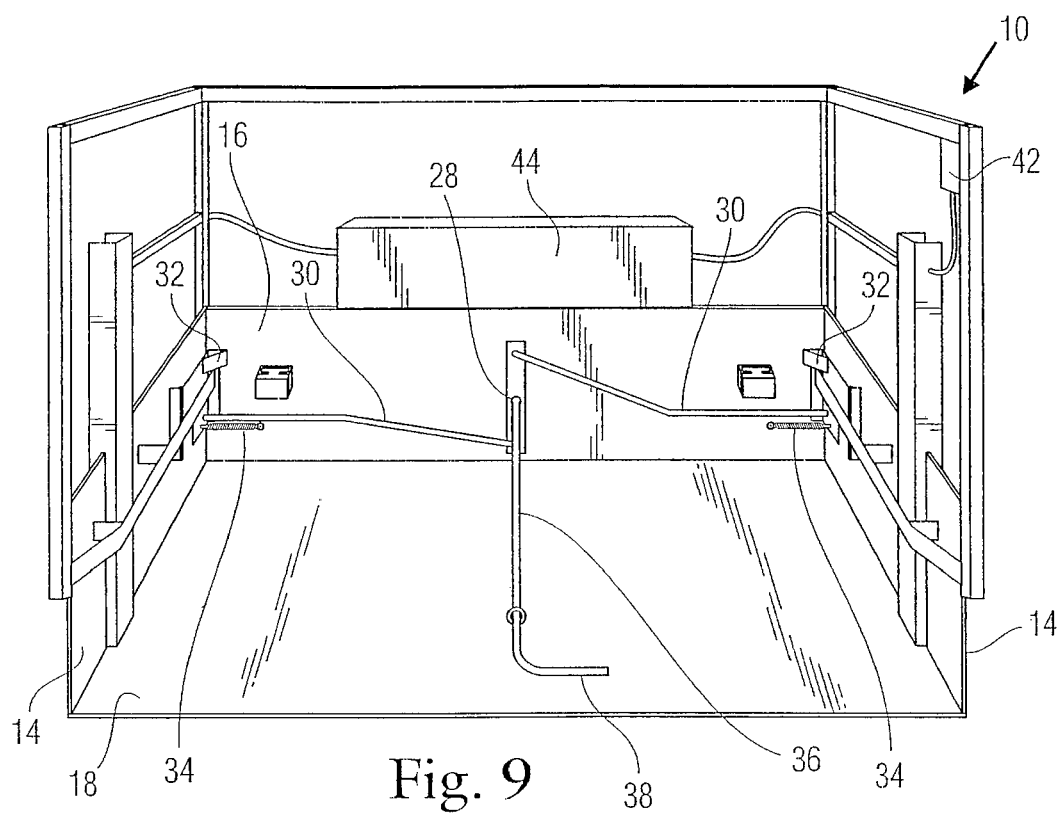
FIG. 9 is a front view into the open end of the cart showing the latch in a locked position.
Figure 10:
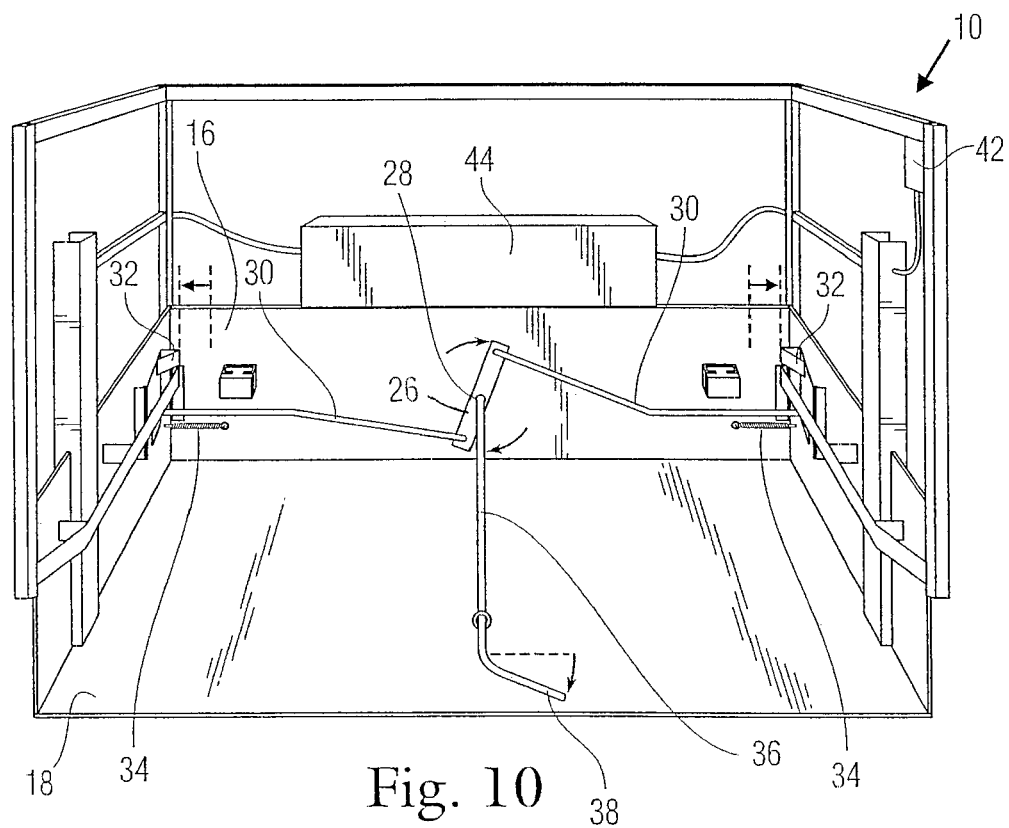
FIG. 10 is a view of FIG. 8 showing release of the latch.
Figure 11:
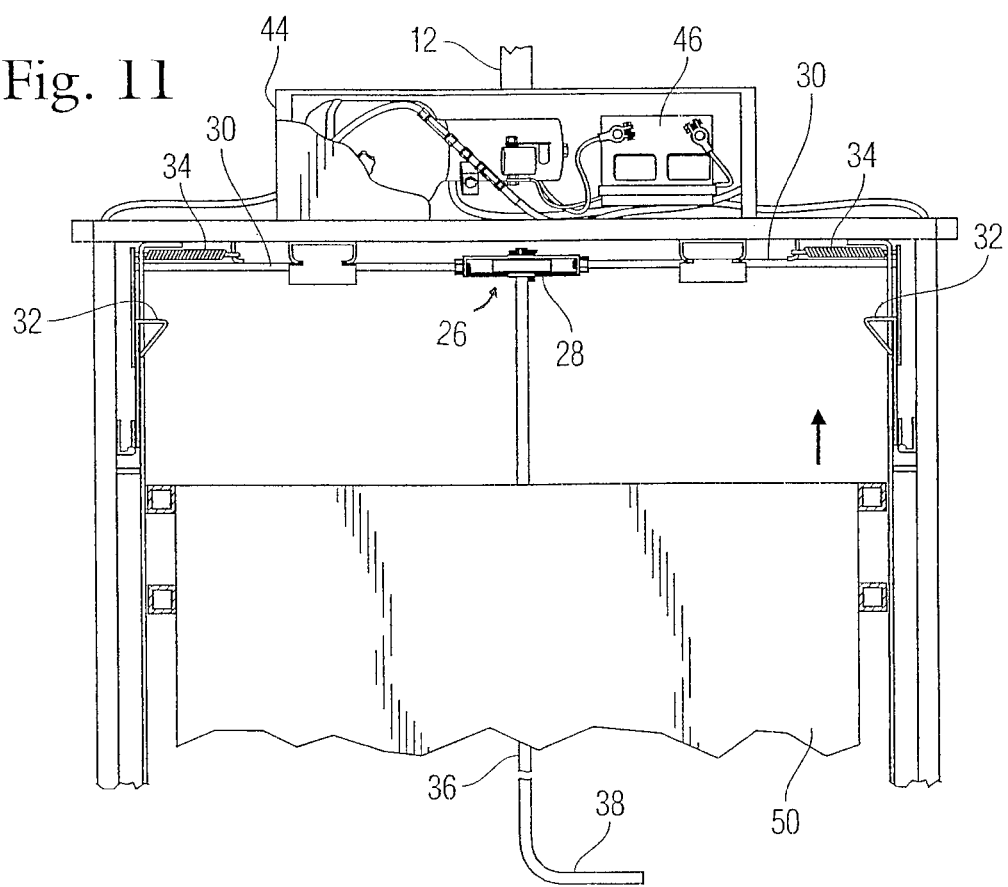
FIG. 11 is a top plan view showing the rack being moved into the cart with the hook means unengaged.
Figure 12:
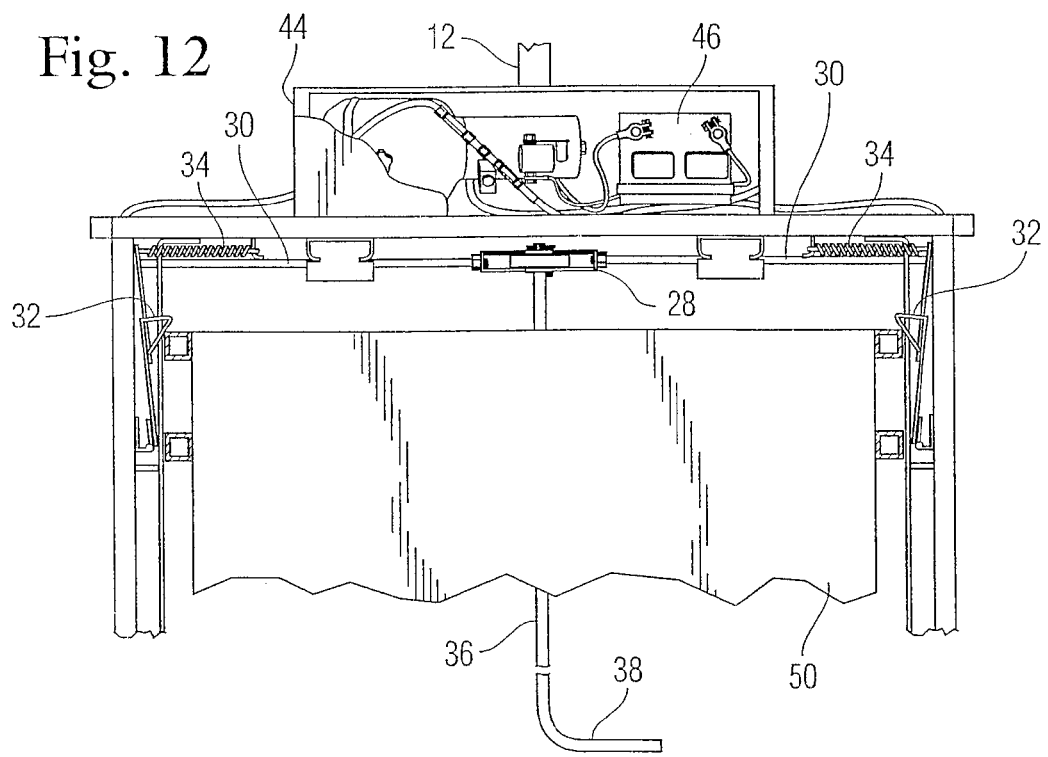
FIG. 12 shows FIG. 11 with the rack being moved to initiate engagement of the hook means.
Figure 13:
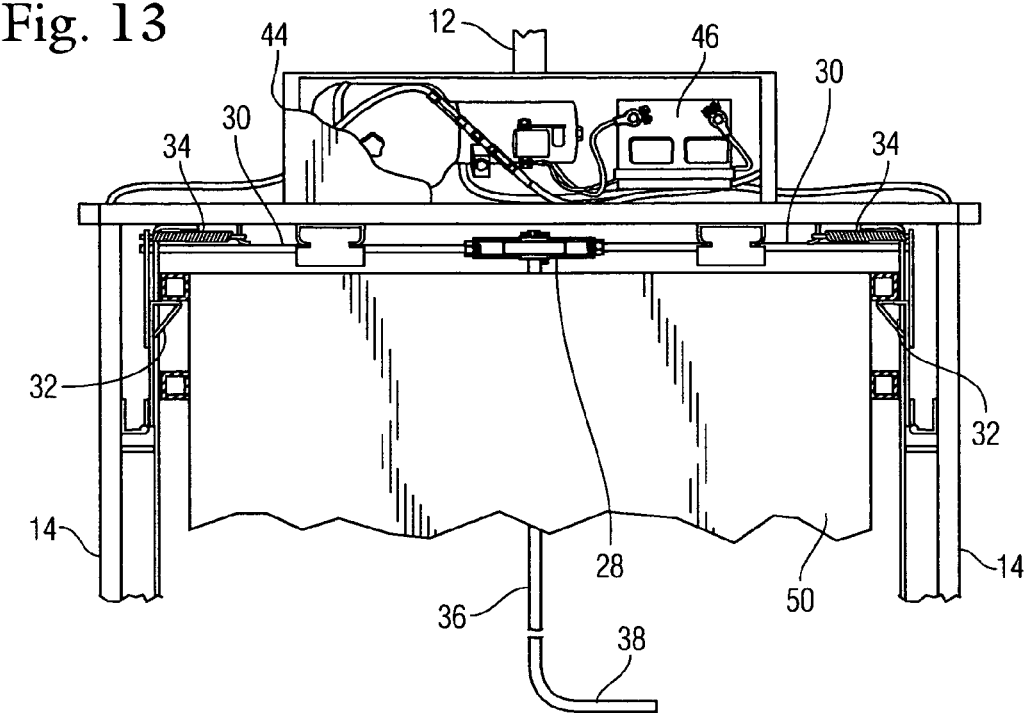
FIG. 13 shows FIG. 11 with the rack being fully moved into the cart and the hook means in a locked position.
Figure 14:
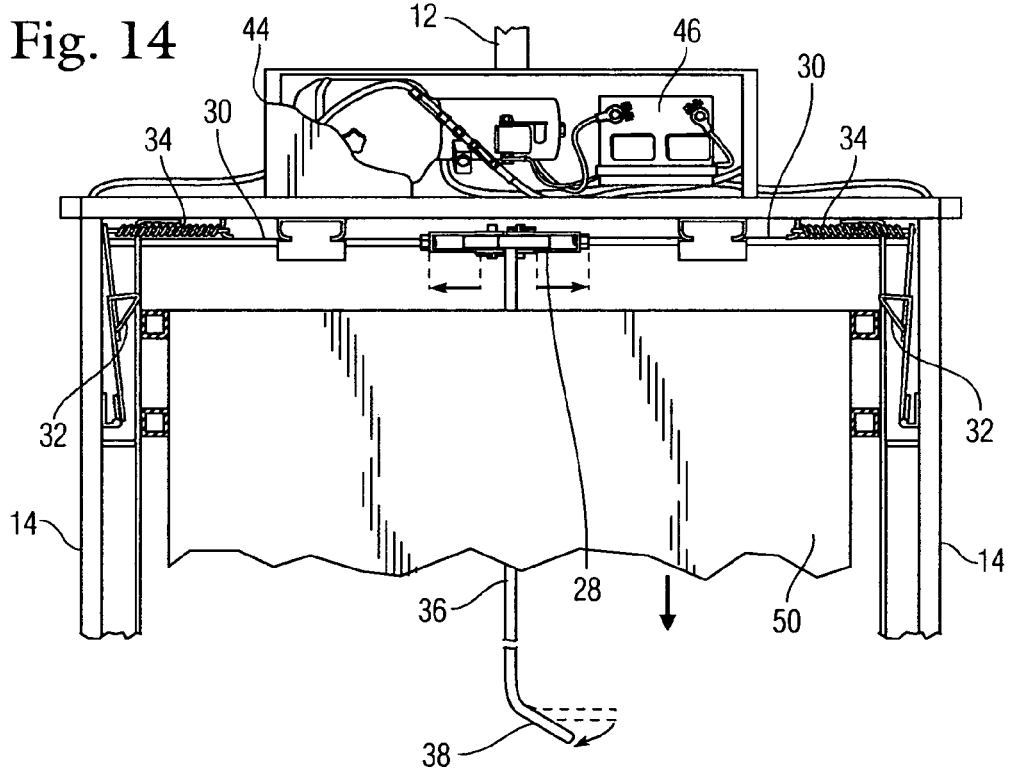
FIG. 14 shows FIG. 12 with the rod turned to retract the hook means, disengaging the hook means and moving the rack toward the open end of the cart.

Because of this feature, a rack 50 or other load may be easily moved into the inclined lowered bed 18 (FIG. 8) and during transport, the rack or load is on a level position.

A latch means 26 is provided to automatically engage the rack 50 when the rack is moved into the cart 10. The latch means 26 is manually released to remove the rack. In a preferred embodiment (FIGS. 9-14), the latch means 26 is a rotatable member 28 mounted on the front wall 16 of the cart. A pair of arms 30 are pivotally connected to the rotatable member 28. The arms 30 extend outwardly in opposite directions from each other. At the end of each arm 30, distal from the rotatable member, the respective arms 30 are each connected to a hook means 32. Each hook means 32 is hingedly connected to the respective side wall 14 and each is further connected to a spring 34. The rotatable member 28 is normally in a vertical position such that the respective arms 30 pull the hook means 32 toward the rotatable member 28 within the cart 10. The springs 34 are not extended. A rack positioned in the cart is engaged by the hook means 32 and the rack is secured in the cart 10. One end of a rod 36 is connected to the rotatable member, the opposite end of the rod 36 is disposed near the open end of the cart 10 and has angle bend 38 formed thereon. Pressure applied to the angle bend 38 (manually or by foot) causes the rod 36 to rotate axially causing the rotatable members 28 to rotate and push the arms 30 against the hook means 32. The hook means 32 are moved toward the side walls 14 and disengage from the rack. The rack can be moved toward the open end of the cart 10. The springs 34 are extended and urge the hook means 32 inwardly toward the rotatable member 28. When the rack is moved into the cart, an upright member at a corner of the rack contacts the hook means 32 and pushes the hook means outwardly against the springs 34. As the rack is moved to the front wall, the springs 34 urge the hook means 32 inwardly to engage the rack and to secure it within the cart.

Figure 15:
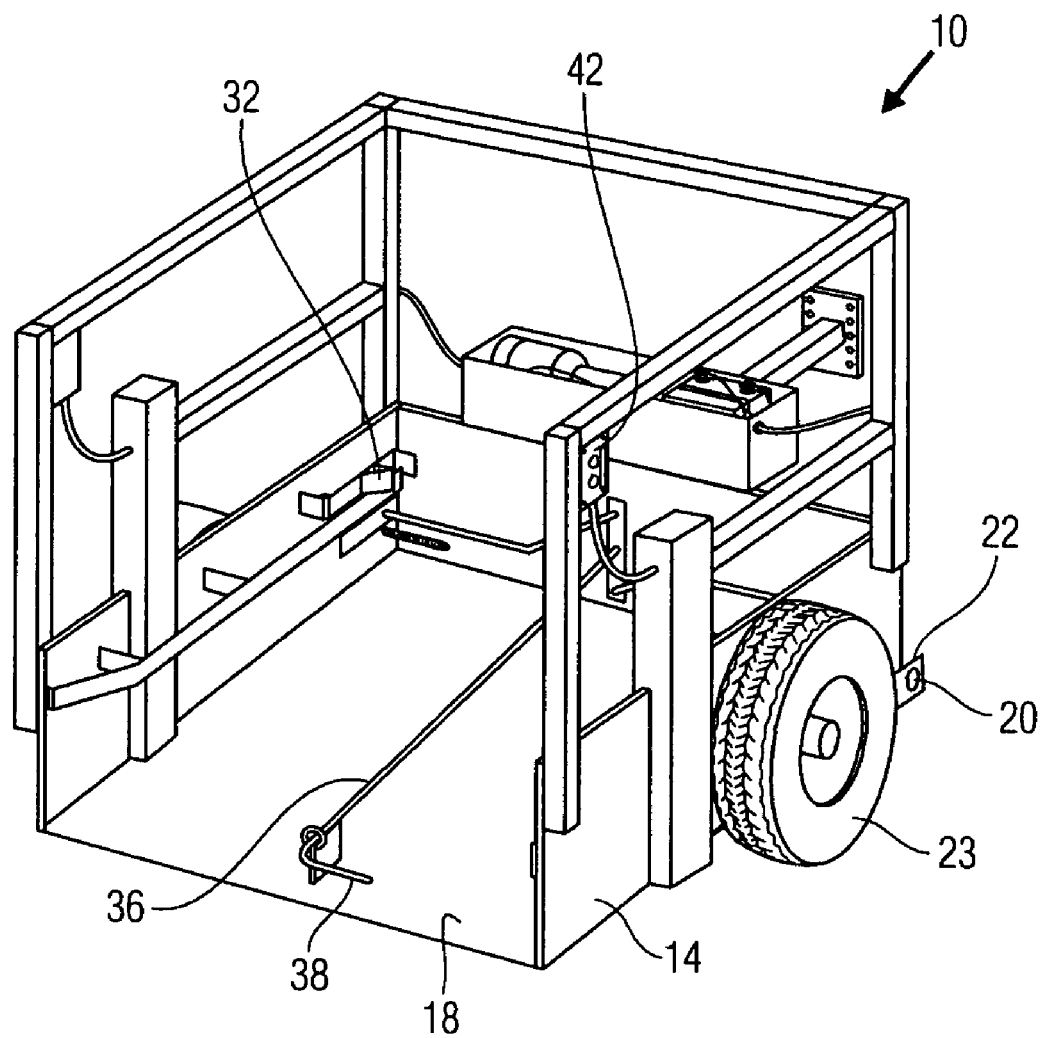
FIG. 15 is a perspective view showing push button control for raising and lowering the bed.
Figure 16:
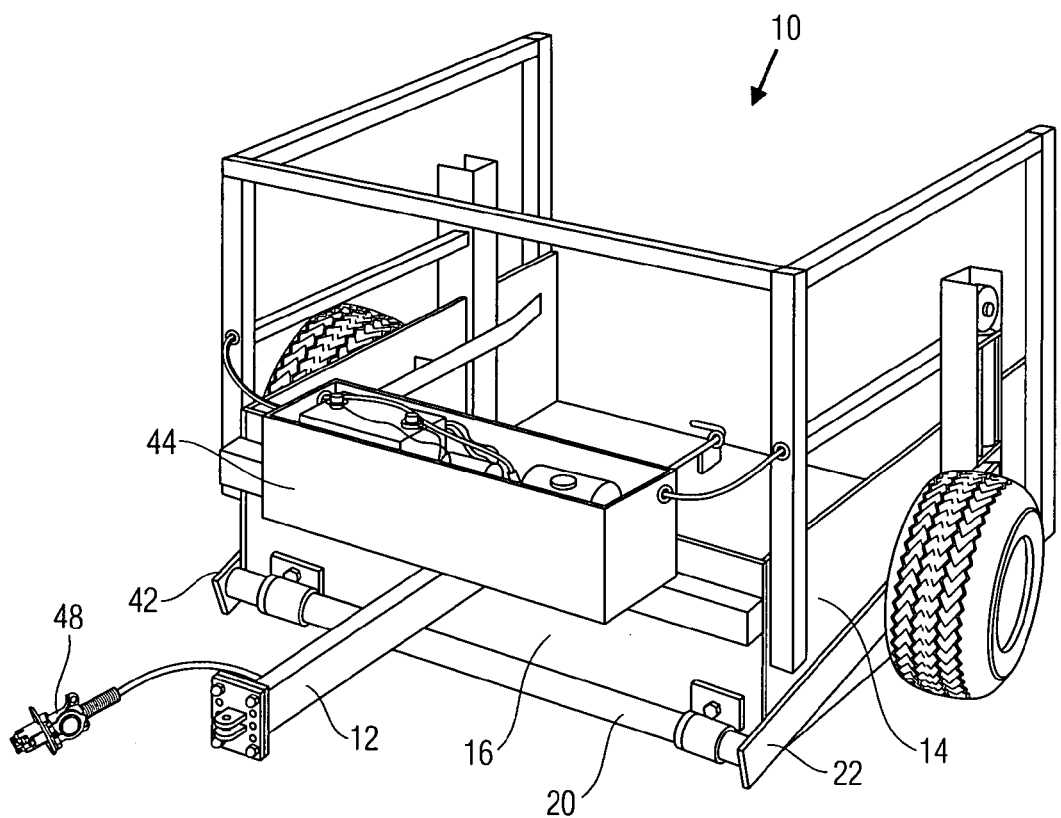
FIG. 16 is a perspective view showing an adapter plug between the tractor and the cart.
Figure 17:
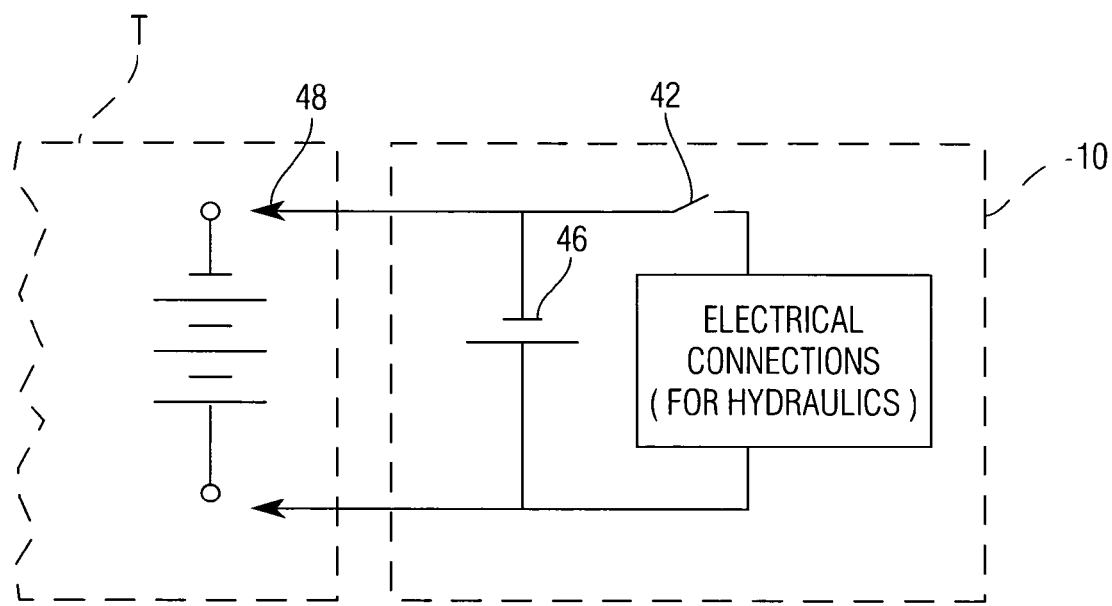
FIG. 17 is a schematic view showing the adapter plug of the cart connected to a battery of the tow vehicle.
Figure 20:
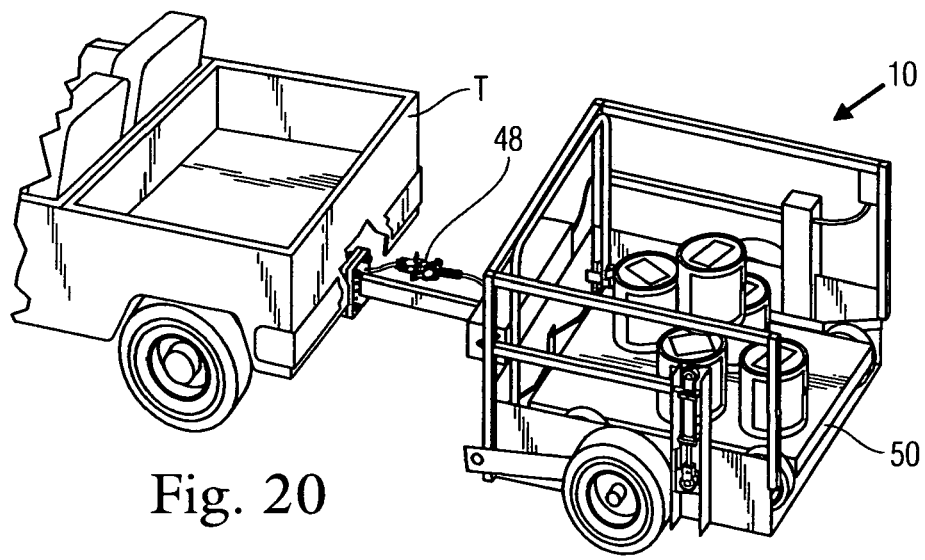
FIG. 20 shows the wheeled platform of FIG. 18 loaded on the cart and being moved by a tow vehicle.

The means for raising the bed 18 of the cart 10 can be mechanical, electrical or hydraulic. A preferred embodiment uses a hydraulic system wherein two hydraulic cylinders 40 are provided, one on each side wall and preferably near the open end of the cart (FIGS. 5-7). The hydraulic cylinders are connected to the second ends of the respective members 22 and control the raising and lowering of the bed 18. Each hydraulic cylinder is disposed preferably within a covered chamber, on a respective side wall of the cart. A pushbutton control 42 mounted on the cart 10 near the open end is a convenient means to load the rack and to raise/lower the bed (FIG. 15). A utility box 44 is mounted in the front wall 16 forwardly thereof (FIGS. 1-2). The utility box 44 contains electrical and hydraulic components including a battery 46. There is an adaptor plug 48 between the cart and the towing vehicle T (FIG. 16). The cart can utilize the battery in the towing vehicle T if required (FIG. 20). FIG. 17 shows the connection to the heavy duty battery in the towing vehicle T.

As shown in FIG. 3, the rack used in nursery transport has a plurality of ledges in which shelves can be placed at desired heights to accommodate potted plants of various sizes. The weight of these potted plants may be approximately 1,000 pounds so the cart must be sufficiently braced and constructed to accommodate this weight.

Figure 18:
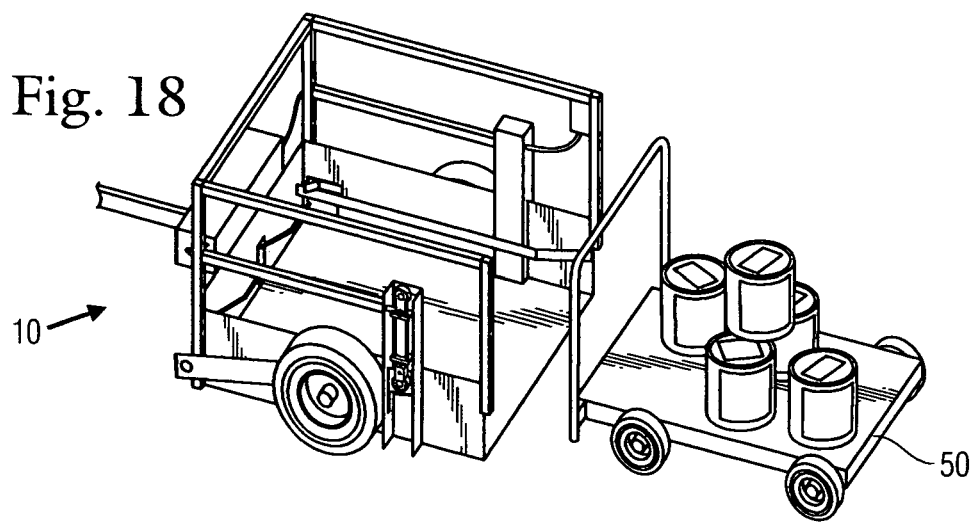
FIG. 18 is a perspective view of a wheeled platform having drums of material to be loaded on the cart of the present invention.
Figure 19:
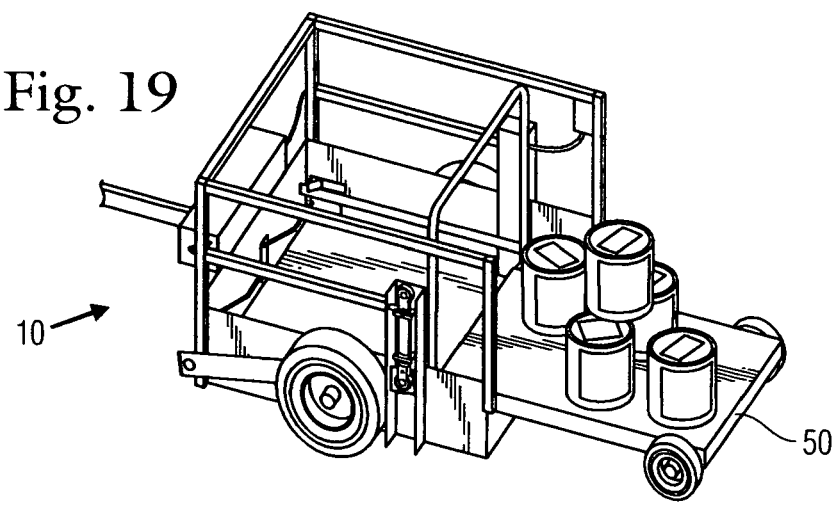
FIG. 19 shows the wheeled platform of FIG. 18 being loaded on the cart.

FIGS. 18-20 show an alternate loading of the cart 10 of the present invention using a wheeled vehicle loaded with drums of material. The wheeled vehicle has a receiving means to engage the latch means in the cart.

Figure 21:
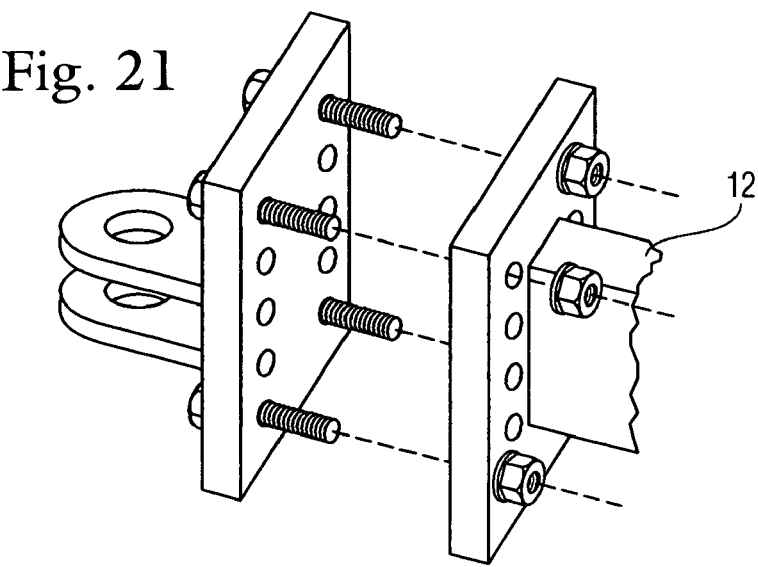
FIG. 21 is a perspective view showing alignment of the hitch on the cart to be connected to the hitch of the tow vehicle.
Figure 22:
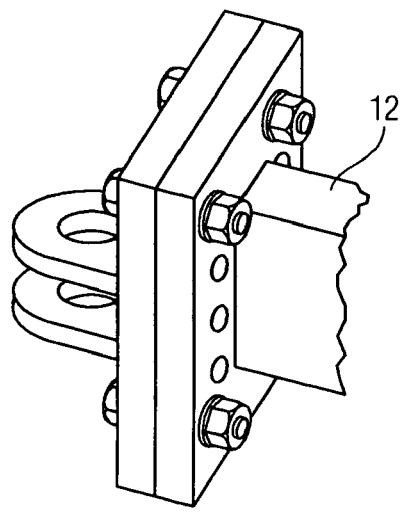
FIG. 22 shows the connection of the hitch of FIG. 21.
Figure 23:
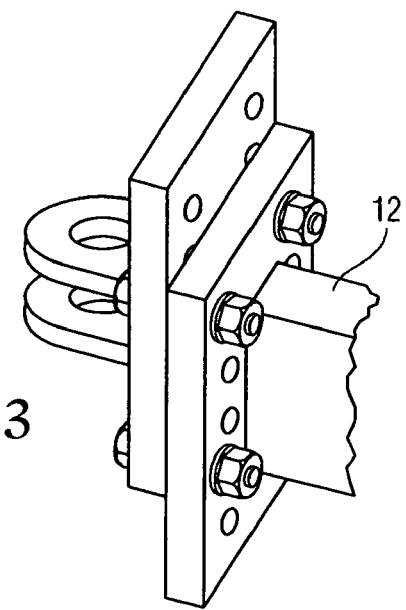
FIG. 23 is a perspective view of the hitch of the cart to be connected to the hitch of the tow vehicle in an alternate alignment.
Figure 24:
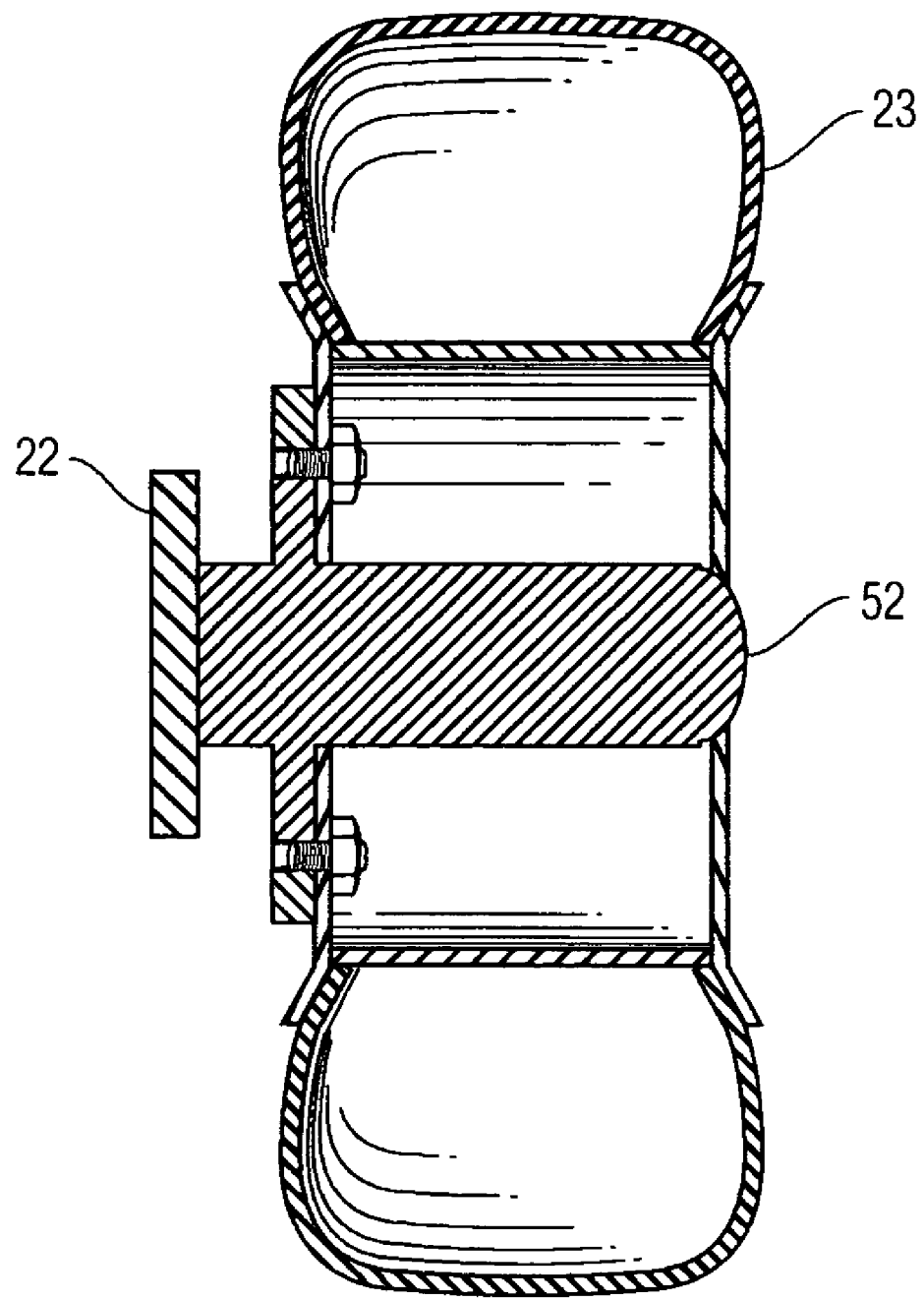
FIG. 24 is a cross section view taken across the lines 24-24 of FIG. 5.

The hitch 12 on the cart 10 is formed to be aligned with a hitch on the tow vehicle. FIGS. 21-23 show the alignment and connection of the hitch 12 on the cart with a hitch on the tow vehicle T. A multiple of openings are formed in the hitch 12 to allow alignment with a towing vehicle hitch which may be of a different height from the ground.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. An apparatus for efficiently loading a mobile rack, the rack holding a plurality of potted plants grown at a first location at a wholesale nursery where the rack is loaded on the apparatus and subsequently unloading the rack at a second location at the nursery, the apparatus for loading the rack on a truck or other transport for ultimate delivery of the potted plants to a retail nursery, comprising a wheeled cart adapted to be coupled to a tractor or other powered vehicle, the cart having an open back end, a front wall and a bed capable of being lowered to substantially the ground level to enable the rack to be moved onto the bed of the cart, a latch in the cart for automatically engaging the rack, the latch having a rotatable member mounted oil the front wall of the cart, a pair of arms being pivotably connected to the rotatable member, the arms extending outwardly in opposite directions from each other, a hook means connected to a respective end of each arm distal from the rotatable member, each hook means being hingedly connected to a respective side wall, each hook means being connected to a respective spring, wherein when the rotatable member is in a normal vertical position, the respective arms pull the hook means toward the rotatable member, wherein when the rack is moved onto the cart, an upright member of a respective corner of the rack contacts the respective hook means and urges the respective hook means outwardly against the springs, the springs urging the respective hook means inwardly as the rack is moved further onto the cart wherein the respective hook means engage the rack and retain the rack in the cart during transport, a rod having a first end connected to the rotatable member, an opposite second end of the rod being disposed near the open back end of the cart, the second end of the rod having an angle bend formed thereon, wherein, axial rotation of the rod, rotates the rotatable member pushing the arms against the respective hook means and disengaging the respective hook means from the rack to release the rack from the cart, wherein the bed of the cart is capable of being raised above the ground level when the cart is at the second location, and the angle bend for disabling the latch to remove the rack from the cart at the second location.

2. The apparatus of claim 1, further including the angle bend usable as a foot-operated lever connected to the rod near the open end of the cart.

3. The apparatus of claim 1, wherein the bed is angled upwardly from the open end to the front wall of the cart, thereby facilitating moving the rack out of the cart.

4. The apparatus of claim 1, wherein the bed of the cart is alternately raised and lowered hydraulically.

5. The apparatus of claim 4, wherein there are two hydraulic cylinders, one on each side wall of the cart near the open end thereof.

6. The apparatus of claim 5, further including a push-button control mounted on a post at one of the side walls at the open end of the cart.

7. The apparatus of claim 4, further including a box mounted on the front wall forwardly thereof, the box containing hydraulic and electrical components.

8. The apparatus of claim 7, including a battery on the cart.

9. The apparatus of claim 1, further including a hitch on the cart forwardly of the front wall thereof for attachment to the tractor or other powered vehicle.

* * * * *